Patented Oct. 28, 1952

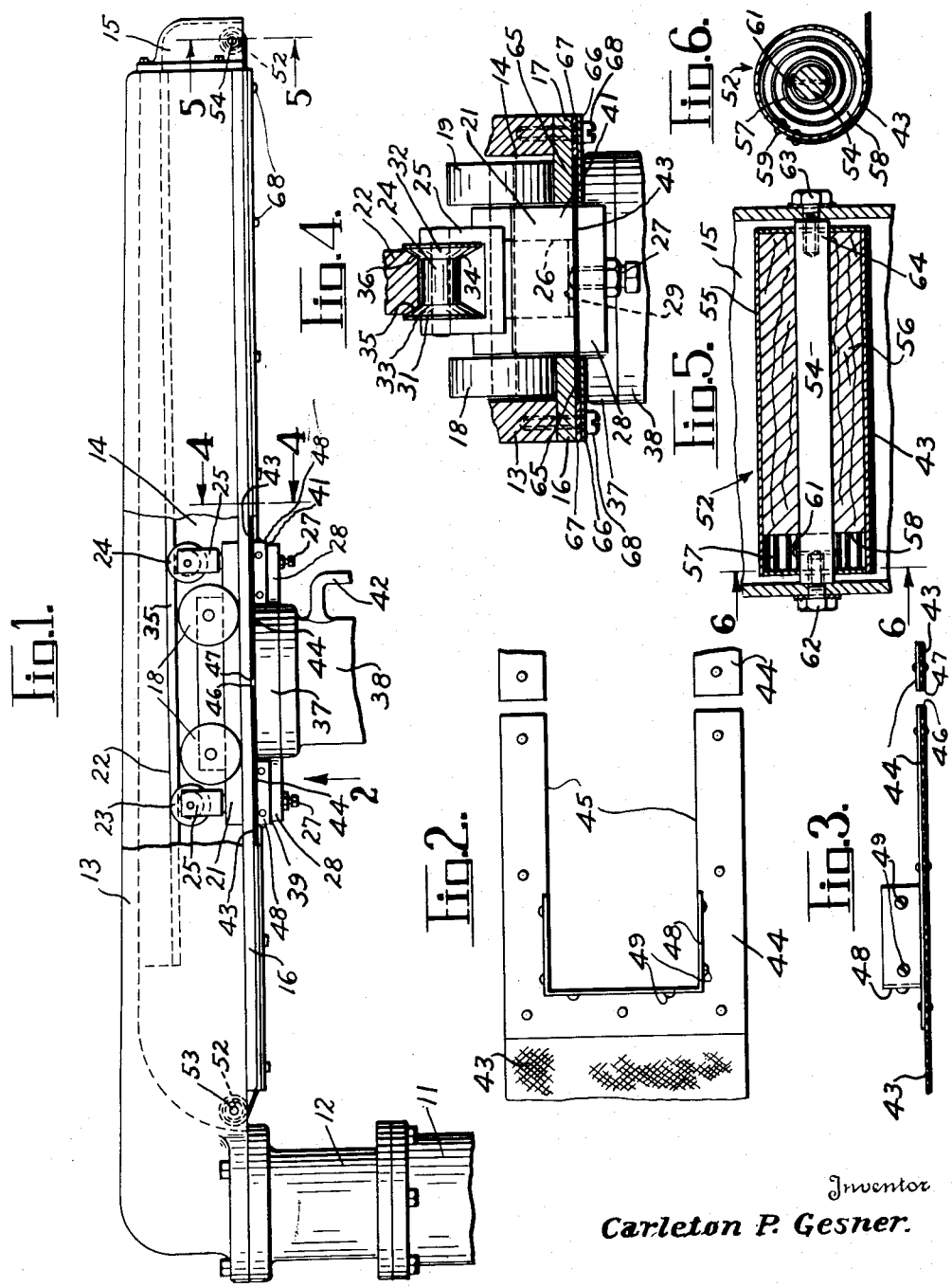

2,615,762

UNITED STATES PATENT OFFICE 2,615,762

TOOL CARRIAGE SUPPORT AND DUST GUARD THEREFOR

Carleton P. Gesner, New Haven, Conn.

Application May 27, 1947, Serial No. 750,777

10 Claims. (Cl. 308—3.5)

1

This invention relates to supports for tool carriages and dust guards therefor and more particularly to a tool carriage supporting arm adapted to have the tool carriage reciprocated in respect thereto and a dust guard, actuated by movement of the carriage in respect to the arm, to cover and thus protect the cooperating operatable and movable parts of the carriage and its supporting arm.

The features and principles of this invention are particularly adapted for association with a woodworking machine of the type known as radial saws and in the structure of which an arm extends outwardly from a column over a work table and in which a tool carriage is adapted to reciprocate in the arm, to guide a tool, such as a circular saw, carried by the carriage, across and along the work. A form of machine to which the features and principles of this invention are particularly and usefully applicable is shown in my copending application Serial No. 712,275, filed November 26, 1946, now Patent No. 2,584,863, issued February 5, 1952.

One of the objects of this invention is to provide an improved form of carriage for a machine of the type known as radial saws.

Another object is to provide an improved form of tool carriage supporting arm for a machine of the above type.

Still another object is to provide, in a machine wherein dust, or the like, is apt to settle on operable parts thereof, suitable means automatically movable into and out of position to cover such operable parts upon movement of said parts during their operation.

A further object is to provide in a radial saw having a tool supporting carriage movable in a supporting arm a guard movable with the carriage to efficiently cover the cooperating operable parts of the carriage and arm.

A still further object is to provide an improved tool carriage support and dust guard therefor, which will be relatively inexpensive to manufacture, simple in construction, compact, and very efficient and durable in use.

With these and other objects in view, which will appear as the description proceeds, there has been illustrated in the accompanying drawings, one form of machine in which the features and principles of this invention may be conveniently and practically embodied.

In the drawings:

Figure 1 is a side view of a tool carriage supporting arm of a radial saw in the structure of

2 which the features and principles of this invention are usefully embodied;

Figure 2 is an enlarged bottom view of the connection between a dust guard and the tool carriage;

Figure 3 is a side view of the partes shown in Figure 2;

Figure 4 is a broken sectional view taken on the line 4—4 of Figure 1;

Figure 5 is a broken sectional view taken on the line 5—5 of Figure 1; and

Figure 6 is a sectional view taken on the line 6—6 of Figure 5.

Referring now to the drawings wherein like reference numerals designate like parts throughout the several views the reference numeral 11 denotes a vertically disposed cylinder extending upwardly from a base (not shown) of a radial saw of the type shown in the above referred to application, and in which a column 12 may be raised, or lowered. Extending horizontally outwardly from the column 12 is an arm 13 which has a slot 14 formed in its underside and extending the greater part of its length, its outer end being closed by a removable cap 15.

Flat strips 16 and 17 one along each lower side edge of the slot 14 extend lengthwise of the arm 13. The strips 16 and 17 extend toward each other over the mouth of the slot 14 and form tracks upon which pairs of rollers 18 and 19, spaced apart lengthwise of the arm 13 and journaled to a tool supporting carriage 21, are adapted to ride and support the carriage 21 on the arm 13. A track 22 intermediate the tracks 16 and 17 and disposed lengthwise along the upper wall of the slot 14 is adapted to be engaged by rollers 23 and 24 mounted for vertical adjustment on the carriage 21. The rollers 23 and 24 are disposed one adjacent each end of the carriage and are journaled in brackets 25 slidable in openings 26 in the carriage 21. Vertical adjustment of the brackets 25 and through them of the rollers 23 and 34 is accomplished by means of adjusting screws 27 screw threaded through a plate 28, fastened to the underside of the carriage 13, and engaging the lower end 29 of the brackets 25.

The rollers 23 and 24 are substantially identical in shape and have axially spaced apart flanged ends 31 and 32. The inner surfaces 33 and 34 of these flanged ends 31 and 32 are inclined, or flared, outwardly away from each other. The track 22 has inclined converging surfaces 35 and 36 along each side thereof, the angularity of which substantially corresponds to the angularity of the inclined surfaces 33 and 34 whereby the tool carriage 21 will be guided in its movements along the arm 13 in the slot 14. The carriage 21 has a member 37 depending therefrom through the slot 14 to which may be attached a support 38 for a tool, such as a motor driven circular saw (not shown). The carriage 21 also has end portions 39 and 41 which depend through the slot 14. The carriage 21 may be manually moved lengthwise in the slot 14 by means of a handle 42 secured to the member 37. The member 37, in this instance is circular in form and extends laterally beyond the slot 14, at each side thereof, with its upper surface disposed below the tracks 16 and 17 and spaced slightly downwardly therefrom.

To substantially eliminate any dust, such as saw dust, formed when a circular saw is used as the tool to cut wood, flying up into the slot 14 and settling on the rollers on the carriage, or upon the tracks upon which the rollers ride, a novel form of guard is provided by this invention. This guard comprises a strip of material 43, preferably of fabric such as cloth extending substantially from each end of the slot 14 to the carriage 21 and adapted to be drawn along with and by the carriage as it is moved lengthwise of the arm 13. The strips 43 extend laterally across the slot 14, underneath the undersurface of the tracks 16 and 17, to close the opening between the opposing edges of the tracks 16 and 17. When the material of the strips is fabric it is preferable that it is selvaged along its lengthwise edges to prevent raveling.

The strips 43 are each, in this instance, connected to the carriage 21 by having an end of each riveted, or otherwise secured to a thin metallic plate 44 which is forked, as at 45, to straddle the depending carriage portions 39, or 41. By this means the opposing ends 46 and 47 of the strips 43 may be brought closely together at the center of the carriage 21 and above the upper surface of the member 37. A flange 48, bent upwardly from the plates 44 at each side and at the end of each carriage portion 39 and 41, is provided by which the plates 44 may be secured to these portions as by screws 49.

The other end of each strip 43 is secured to a roller 52, one of which rollers is disposed at each end of the arm 13 and in the slot 14 thereof. In this instance the roller 52 at the rear end of the arm 13 is journaled on a shaft 53 extending through and across the arm and the roller 52 at the front end of the arm 13 is journaled on a shaft 54 extending through and across the cap 15. Each roller 52 is spring controlled to constantly urge it to rotate to wind the strip 43, secured thereto, upon its periphery, thus maintaining the strips 43 taut at all times regardless of the position of the carriage 21 in the arm 13.

The construction of a preferred form of roller 52 is shown in Figures 5 and 6 wherein the ends of the strips 43 are riveted, or otherwise secured to a metallic shell 55 having a wooden core 56 which is adapted to rotate on the respective shaft 53 or 54. In this instance, only one coiled flat spring 57 is provided for each roller 52 and is housed in a counterbore 58 formed in one end of the roller. A similar spring may be housed in a similar counterbore in the other end of the roller, if desired, and more tension is required. One end of the spring 57 is secured, as by a rivet 59 to the metal shell 55 and the other end is fastened, as by a rivet 61 to the respective shaft 53 or 54.

The shafts 53 and 54 are secured to the walls of the arm 13 and the cap 15 respectively by screws 62, which extend through the respective adjacent wall and screw thread into the end of the respective shaft to draw this shaft end into rigid contact with the wall. The other end of each shaft is fastened to the adjacent wall of the arm 13, or cap 15, by a screw 63 which screw threads into the end 64 of said shafts and securely bottoms in the threaded hole provided therefore. The end 64 of the shafts 53 and 54 is not rigidly clamped to the adjacent wall by the screw 63. By loosening the shaft clamping screw 62 either shaft 53 or 54 may be rotated by the screw 63 in respect to the roller journaled thereon, while the roller 52 is held against rotation, to increase or decrease the tension on the spring 57. The rotation of the shaft 53 or 54 in the direction to wind up the spring 57, while the roller 52 is stationary, will increase the spring tension.

From the above it is evident that the guard strips 43 will, at all positions of the tool carriage in the arm 13, completely cover the open bottom of the slot 14 and prevent dust from entering the slot to settle on the rollers 18, 19, 23 and 24 or on the tracks 16, 17 and 22 and cause inconvenience and inaccuracies in the operation of the tool carried by the carriage 21.

To further insure that no dust enters the slot 14 in the arm 13 a guideway 65 for the strips 43 has been provided at each side of the arm 13 and below the tracks 16 and 17. In the arrangement shown in the drawings, the strips 43 are much wider than the distance between the opposing edges of the tracks 16 and 17 and have each of their side edges disposed in the guideway 65. The guideway 65 may be milled into the opposing edges of the tracks 16 and 17, or may be as shown, and preferred, formed by a relatively thin flat metallic bar 66 of the same width and length as the tracks 16 and 17 with a narrow spacing bar 67 disposed along the outer edge of the tracks and between the bar 66 and the tracks, to form the opposing guideway 65. The bars 66 and 67 with the tracks 16 and 17 are secured to the arm 13 by screws 68.

By the provision of the features and principles of this invention a tool supporting carriage 21 movable in a lengthwise slot 14 in an arm 13 and adapted to overhang the work will be substantially sealed within the arm and thus guarded against having dust from the operation of the tool on the work settling and causing inaccuracies and inconveniences. Due to the counter-action of the springs 57 in the rollers 52 no appreciably added power is required to move the carriage 21 back and forth in the arm 13. The cooperating form of the rollers 23 and 24 and the intermediate track 22 insures efficient guiding of the carriage 21 in and along the arm 13, and the vertical adjusting screws, whereby all of the rollers may be maintained in proper contact with their respective tracks, are readily accessible for actuation.

While there has been shown and described herein a preferred form of device in which the features and principles of this invention are embodied, it will be understood that the same may be embodied in other specific forms without departing from the spirit and essential attributes thereof, and it is therefore desired that the present embodiment be considered in all respects as illustrative, and not restrictive, reference being had to the claims rather than to the foregoing description to indicate the scope of the invention.

Having thus fully disclosed the invention, what is claimed as new and for which it is desired to secure Letters Patent, is:

1. In a tool carriage support, an arm having a slot provided threin substantially its entire length and open at the bottom surface of said arm, a flat surfaced track on the bottom surface of said arm at each side of said slot, a carriage having flat faced side rollers adapted to ride upon the upper surface of said tracks, a depending track in the slot of said arm, rollers on said carriage engaging said depending track, each of said last mentioned rollers having a flat faced intermediate portion and end flanges with opposing outwardly and upwardly inclined faces, said depending track having inclined converging side faces to engagingly cooperate with the inclined faces of said rollers to guide the carriage along the first mentioned tracks.

2. In a tool carriage support, an arm having a slot provided therein substantially its entire length and open at the bottom surface of said arm, a flat surfaced track on the bottom surface of said arm at each side of said slot, a carriage having flat faced side rollers adapted to ride on the upper surface of said tracks, a depending track in the slot of said arm, rollers on said carriage engaging said depending track, each of said last mentioned rollers having a flat faced intermediate portion and end flanges with opposing outwardly and upwardly inclined faces, said depending track having inclined converging side faces to engagingly cooperate with the inclined faces of said rollers to guide the carriage along the first mentioned tracks, a bracket supporting each last mentioned roller, and means extending upwardly through the carriage to vertically adjust said bracket.

3. In a tool carriage support in accordance with claim 1 and wherein means is provided to prevent dust from settling on said tracks and rollers, said means comprising a strip of material secured to the carriage and extending therefrom toward each end of the tracks, said strip of material extending across and underlying the undersurface of the tracks, and a spring actuated roller at each end of said tracks and to which the strip of material is attached, adapted to wind up said strip of material as the carriage is moved.

4. In combination, a pair of laterally spaced apart elongated flat faced tracks having opposed inner edges, a tool supporting carriage adapted to ride on, and be reciprocated along, the upper surface of said tracks, each of said tracks having a guideway associated therewith and extending lengthwise thereof along the inner edge of the track adjacent its undersurface, said guideways being in opposed relation, a strip of flexible material extending from each end of said carriage toward an end of the tracks, said strip of material extending across the tracks with a side edge thereof in each guideway, and means at each end of the tracks to maintain the strip of material taut.

5. In combination, a pair of laterally spaced apart elongated flat faced tracks, a tool supporting carriage adapted to ride on, and be reciprocated along, the upper surface of said tracks, a thin bar disposed under and extending lengthwise along the undersurface of each track, said bars being spaced downwardly from each track to form opposing guideways, a strip of flexible material extending from each end of said carriage toward an end of the tracks, said strip of material extending across the tracks with a side edge thereof in each guideway, and means at each end of the tracks to maintain the strip of material taut.

6. In combination, an elongated arm adapted to extend outwardly from a supporting column, said arm having a slot therein extending substantially the entire length and open at the bottom surface and outer end thereof, a track disposed along the arm upon the lower surface thereof at each side of the slot therein, a tool supporting carriage adapted to ride on, and be reciprocated along, the upper surface of said tracks, a cap closing the outer open end of said arm, a spring actuated roller mounted in the arm adjacent its inner end, a spring actuated roller mounted in said cap, and strips of flexible material secured to the respective ends of said carriage and extending beneath the undersurface of said tracks and across the same, said strips of material extending to and being attached to the respective rollers.

7. In combination, an elongated arm adapted to extend outwardly from a supporting column, said arm having a slot therein extending substantially the entire length and open at the bottom surface and outer end thereof, a track disposed along the arm upon the lower surface thereof at each side of the slot therein, a tool supporting carriage adapted to ride on, and be reciprocated along, the upper surface of said tracks, a cap closing the outer open end of said arm, a spring actuated roller mounted in the arm adjacent its inner end, a spring actuated roller mounted in said cap, and strips of flexible material secured to the respective ends of said carriage and extending beneath the undersurface of said tracks and across the same, said strips of material extending to and being attached to the respective rollers, a bar extending lengthwise along the undersurface of each track, said bars being spaced downwardly from each track to form opposing guideways, the edges of said strips of flexible material riding in and along the guideways.

8. In a support for a tool-supporting carriage, a pair of laterally spaced tracks adapted to support a tool-supporting carriage to be reciprocated thereon, a pair of spring-actuated rollers, one of said rollers being disposed at one end of said tracks and the other being disposed at the other end of said tracks, two strips of material extending under said tracks and secured to the respective rollers, each of said strips extending to the carriage and extending laterally across said tracks, one of said strips being unwound from one of said rollers and the other being wound-up by the other of said rollers as the carriage is moved along the tracks, and a guideway along the inner and opposing edges of said tracks to receive the side edges of the strips and insure closure of the space between the tracks.

9. In a support for a tool-supporting carriage, a pair of laterally spaced tracks adapted to support a tool-supporting carriage to be reciprocated thereon, a pair of spring-actuated rollers, one of said rollers being disposed at one end of said tracks and the other being disposed at the other end of said tracks, each roller having a counterbore, a spring disposed in the counterbore having one end thereof secured to the roller, a shaft to which the other end of the spring is secured and upon which the roller is rotatably mounted, means to retain the shaft against rotation, means to rotate the shaft to adjust the tension of said spring, and two strips of material extending under said tracks and secured to the respective rollers, each of said strips extending to said carriage and extending laterally across said tracks, one of said strips being unwound from one of said rollers and the other being wound-up by the other of said rollers as said carriage is moved along said tracks.

10. In a support for a tool-supporting carriage, a substantially horizontal and hollow arm, a pair of tracks extending longitudinally of said arm at the lower portion thereof, said arm having a lower longitudinal opening therein between said tracks, said tracks being adapted to support a tool-supporting carriage extending into said opening for reciprocating movement on said tracks, a strip of material secured to said carriage and adapted to extend along said arm below said tracks to close said opening in the arm, and means at one end of said arm to wind-up said strip when said carriage is moved toward said end of the arm, said means comprising a spring-actuated roller journaled at said end of the arm and secured to said strip, said roller being disposed with the lower portion of its periphery above the undersurface of said tracks whereby said strip of material is drawn tightly against the undersurface of said tracks as said strip is wound on said roller.

CARLETON P. GESNER.

REFERENCES CITED

The following references are of record in the file of this patent:

UNITED STATES PATENTS

| Number | Name | Date |
|---|---|---|
| 672,337 | Stanley | Apr. 16, 1901 |
| 1,679,912 | Mondloch | Aug. 7, 1928 |
| 1,794,836 | De Walt | Mar. 3, 1931 |
| 1,815,037 | De Walt | July 21, 1931 |
| 2,190,213 | Meyer | Feb. 13, 1940 |
| 2,418,639 | Horman | Apr. 8, 1947 |